United States Patent Office 3,242,203
Patented Mar. 22, 1966

3,242,203
METHOD FOR PRODUCING β-FORMYLPROPIO-
NITRILE FROM ACRYLONITRILE
Gentaro Noyori and Hidemoto Kurokawa, Tokyo, and
Makoto Honda, Musashino-shi, Tokyo, Japan, assignors to The Noguchi Institute, Tokyo, Japan, a corporation of Japan
No Drawing. Filed Apr. 23, 1963, Ser. No. 274,918
Claims priority, application Japan, Apr. 27, 1962,
37/17,065
6 Claims. (Cl. 260—465.1)

The present invention relates to a method for producing β-formylpropionitrile from acrylonitrile. More particularly, it relates to an improvement in the production of β-formylpropionitrile from acrylonitrile by an oxo reaction, which improvement comprises that the said reaction is carried out by use of a solvent which can dissolve β-formylpropionitrile in an amount of 0.09 to 20% by weight at 20° C.

An object of the invention is to provide a novel method by which β-formylpropionitrile, an important intermediate for the production of DL-glutamic acid from acrylonitrile, is produced in high yield and is separated easily without loss.

β-formylpropionitrile is an important intermediate in organic syntheses. Especially, it can be employed for the synthesis of DL-glutamic acid by reaction with hydrocyanic acid and ammonia, followed by hydrolysis. Accordingly, the method of the present invention serves for the improvement of the production process of DL-glutamic acid from acrylonitrile.

β-formylpropionitrile formed by the reaction of acrylonitrile with a mixed gas consisting of carbon monoxide and hydrogen in a solvent in the presence of cobalt carbonyl catalyst is unstable. H. Adkins et al. have reported that acrylonitrile is subjected to an oxo reaction, but the product can not be isolated, probably due to change of β-formylpropionitrile once formed. Thus, the instability of β-formylpropionitrile brings forward a problem of the separation from oxo reaction mixture.

Various methods have been proposed. For example, U.S. Patent 3,010,994 discloses a method for producing glutamic acid from acrylonitrile in which an oxo reaction mixture from acrylonitrile is directly employed, without separation of the product, for the subsequent step. Japanese patent publication No. 5,907/1962 and British Patent No. 828,946 disclose a method in which β-formylpropionitrile in an oxo reaction mixture of acrylonitrile is separated by an extraction with water and then used in the subsequent step. In the former method, however, the reaction of β-formylpropionitrile is effected in the presence of solvent and catalyst used in the oxo reaction. This causes problems of recoveries of the solvent and the catalyst. In the latter method, the extraction of the oxo reaction mixture with water is a troublesome procedure. Although β-formylpropionitrile is obtained as an aqueous solution, its loss in this procedure is unavoidable. In a method of employing a polar solvent in oxo reaction of acrylonitrile, disclosed in Japanese patent publication No. 2,574/1961 and U.S. Patent 2,978,481, β-formylpropionitrile formed is stable and the solvent and the catalyst can be recovered with a comparatively little loss of β-formylpropionitrile. However, the decomposition of catalyst and the distillation of solvent involve troublesome procedures.

In the method of the present invention the oxo reaction of acrylonitrile is carried out in a solvent which can dissolve β-formylpropionitrile in an amount of 0.09% to 20% by weight at 20° C. Accordingly, by using such a solvent, the reaction mixture forms two layers namely the reaction product layer and the solvent layer containing catalyst either as the reaction proceeds or upon cooling after the reaction finishes. The two layers can be separated from each other to obtain the solvent layer containing catalyst and the β-formylpropionitrile layer. The solvents which can be employed in the present invention include hydrocarbons other than unsaturated aliphatic hydrocarbons e.g. hydrocarbons boiling at a temperature between 28° C. and 330° C., ranging from heptane to nonadecane among paraffinic hydrocarbons represented as general formula, $C_nH_{2n+2}$, wherein $n$ being 5 to 19, cycloparaffinic hydrocarbons boiling at a temperature between 49° C. and 350° C. comprising cyclopentane, cyclohexane and alkyl derivatives thereof, represented as $C_nH_{2n}$, aromatic hydrocarbons boiling at a temperature below 330° C. such as benzene, toluene, ethylbenzene, xylene, isopropylbenzene and other alkylbenzenes, or mixtures thereof, and mixed solvents which dissolve β-formylpropionitrile in an amount of 0.09 to 20% by weight at 20° C. such as oxygen-containing organic solvents which do not interfere with the oxo reaction, e.g. mixed solvents of two or more varieties of alcohols, such as alcohols having up to 8 carbon atoms e.g. methanol, ethanol, n-propanol, isopropanol, butanols, amyl alcohols, octyl alcohols, higher alcohols (isooctyl, decyl, tridecyl, etc.), tetrahydrofurfuryl alcohol, cyclohexanol, ethylene glycol, propylene glycol, polyethylene glycol etc., ketones, for example ketones having from 3 to 6 carbon atoms such as acetone, methyl ethyl ketone, methyl n-propyl ketone, methyl isobutyl ketone, as well as cyclic ketones like cyclohexanone, methylcyclohexanone etc., ethers for example, alkyl ether having up to 8 carbon atoms as ethyl ether, isopropyl ether, n-butyl ether, and also methyl Cellosolve, Cellosolve, 1,2-propylene oxide, dioxane, tetrahydrofuran etc. and esters e.g., methyl formate, ethyl formate, methyl acetate, ethyl acetate, n-propyl acetate, isopropyl acetate, butyl acetate, methyl amylacetate, cyclohexylacetate, ethylene glycol monoacetate, glycol diacetate, amyl propionate, diethylcarbonate diethyloxalate etc.

By use of such a single solvent or a solvent mixture, which can dissolve β-formylpropionitrile in an amount of 0.09 to 20% by weight at 20° C., the oxo reaction mixture forms two layers of the solvent and the product which can be separated from each other to obtain the product. If a solvent used is one which can dissolve β-formylpropionitrile in an amount less than 0.09% by weight, β-formylpropionitrile formed by the oxo reaction of acrylonitrile tends to be polymerized, thus the yield is decreased. If a solvent used is one which can dissolve β-formylpropionitrile in an amount more than 20% by weight, the amount of β-formylpropionitrile separated when the reaction mixture is cooled is decreased, thus the isolation efficiency is unsatisfactory. Therefore, the solubility of 0.09 to 20% by weight is essential in the present invention.

The solubilities of β-formylpropionitrile in various kinds of solvent are illustrated below.

| Solvent | Temperature (° C.) | Solubilities (weight percent) |
|---|---|---|
| Cyclohexane | 20 | 0.23 |
| Do | 60 | 0.27 |
| Petroleum ether (B.P. 30-60° C.) | 20 | 0.09 |
| Xylene | 20 | 7.97 |
| Do | 50 | 20.87 |
| Benzene + petroleum ether: | | |
| 1:1 | 20 | 2.58 |
| 1:2 | 20 | 1.06 |
| 1:3 | 20 | 0.65 |
| 1:7 | 20 | 0.28 |
| Benzene + cyclohexane: | | |
| 1:2 | 20 | 0.71 |
| 1:3 | 20 | 0.48 |
| Ethyl acetate + cyclohexane: | | |
| 1:3 | 20 | 2.52 |
| 1:7 | 20 | 0.74 |
| 1:8 | 20 | 0.58 |
| Tetrahydrofuran + cyclohexane: | | |
| 1:3 | 20 | 1.96 |
| 1:6 | 20 | 0.79 |
| Swasol-200 (produced by Maruzen Sekiyu Co.) | 20 | 2.96 |
| Do | 60 | 4.01 |
| Swasol-310 (produced by Maruzen Sekiyu Co.) | 20 | 1.12 |
| Do | 60 | 1.78 |
| Ligroin | 20 | 0.085 |
| Mitsui-MSS | 20 | 3.42 |
| Ethyl alcohol:Cyclohexane: | | |
| 1:15 | 20 | 11.31 |
| 1:5 | 20 | 2.47 |
| 1:9 | 20 | 1.17 |
| 1:19 | 20 | 0.58 |
| Ethyl ether:Cyclohexane: | | |
| 1:2 | 20 | 0.71 |
| 1:3 | 20 | 0.48 |
| Xylene:Petroleum ether: 1:1.5 | 20 | 1.0 |
| Toluol:Petroleum ether: 1:1.5 | 20 | 1.23 |
| Toluol:Ligroin: | | |
| 1:2 | 20 | 0.79 |
| 1:3 | 20 | 0.46 |
| Xylene:Cyclohexane: | | |
| 1:1 | 20 | 1.38 |
| 1:1.5 | 20 | 0.93 |
| 1:3 | 20 | 0.47 |
| Toluol:Cyclohexane: | | |
| 1:1 | 20 | 1.74 |
| 1:3 | 20 | 0.54 |
| 1:4 | 20 | 0.47 |

Swasol (produced by Maruzen Sekiyu Co.) is a trade name of a petroleum-aromatic mixed solvent, which is a mixture of aromatic, paraffinic and naphthenic hydrocarbons, similar to Supersol (produced by Mitsubishi Sekiyu Co.), Mitsui-MSS (produced by Mitsui Sekiyu Kagaku Kogyo Co.) and HAWS (produced by Shell Petroleum Co.), and is one of solvents suitable for the method of the invention.

In separating β-formylpropionitrile formed by means of a solvent according to the invention, a major part of cobalt carbonyl catalyst remains in the solvent layer. This fact means that the separation of the catalyst from the reaction product is effected at the same time. It is a notable commercial advantage that the solvent layer separated from the β-formylpropionitrile product can be employed repeatedly for the subsequent step, merely by supplementing the amount of catalyst lost, the starting acrylonitrile and the amount of solvent lost.

The method of the invention will be more fully illustrated with reference to the following examples, which are, however, set forth merely by way of illustration and not by way of limitation.

Example 1

To a mixture of 10.6 g. of acrylonitrile, 1 g. of cobalt carbonyl and 1 g. of hydroquinone, was added petroleum ether (B.P. 30-60° C.) to make a 200 ml. solution, which was placed in a 500 ml.-volume autoclave. An equivolume gas mixture of carbon monoxide and hydrogen ($H_2$:CO=1:1) was fed to the autoclave at the pressure of 220 kg./cm.$^2$ and the content was allowed to react at a temperature of 70° to 100° C. After the reaction was completed, the reaction mixture was cooled, and the two layers formed were separated from each other by means of a fractionating funnel. By analyses, the lower layer amounting 15.3 ml. showed the presence of 9.4 g. of β-formylpropionitrile (56.6% yield based upon acrylonitrile) and the absence of the catalyst, while the upper layer amounting 188 ml. showed the presence of a slight amount of β-formylpropionitrile and 0.99 g. of the catalyst.

Example 2

To a mixture of 26.5 g. of acrylonitrile, 1.2 g. of cobalt carbonyl and 1 g. of hydroquinone, is added a benzene-petroleum ether mixed solvent in 1:3 volume ratio, to make a 200 ml. solution, which is placed in a 500 ml.-volume autoclave. An equivolume gas mixture of carbon monoxide and hydrogen ($H_2$:CO=1:1) was fed to the autoclave at the pressure of 230 kg./cm.$^2$ and the content was allowed to react at a temperature of 110° to 120° C. After the reaction was completed, the reaction mixture was cooled, and the two layers formed were separated from each other. Both layers were analyzed, and the upper layer was again added with 26.5 g. of acrylonitrile and 0.2 g. of cobalt carbonyl, and subjected to the same reaction as the above. Both layers were again analyzed. The results were as follows.

| | Lower layer | | | | Upper layer | | | |
|---|---|---|---|---|---|---|---|---|
| | β-Formylpropionitrile | | Catalyst | | β-Formylpropionitrile | | Catalyst | |
| | Gms. | Percent | Gms. | Percent | Gms. | Percent | Gms. | Percent |
| 1 | 28.4 | 68.5 | 0 | 0 | 0.95 | 2.3 | 1.01 | 84.3 |
| 2 | 28.1 | 67.7 | 0 | 0 | 1.08 | 2.6 | 1.03 | 86.5 |

Example 3

To a mixture of 26.5 g. of arcylonitrile, 1.0 g. of cobalt carbonyl and 1 g. of hydroquinone, was added a tetrahydrofuran cyclohexane mixed solvent in 1:6 volume ratio, to make a 200 ml. solution, which was placed in a 500 ml.-volume autoclave. The content was subjected to the same reaction procedure as in Example 2. After the reaction was completed, the reaction mixture was cooled, and the two layers formed were separated from each other by means of a fractionating funnel. By analyses, the lower layer amounting 42.6 ml. showed the presence of 29.67 g. of β-formylpropionitrile (71.4% yield) and the catalyst content ratio of 23.6%, while the upper layer amounting 154 ml. showed the presence of 0.75 g. of β-formylpropionitrile (1.8%) and the catalyst content ratio of 6.8%.

Example 4

A mixture of 26.5 g. of acrylonitrile, 1.2 g. of cobalt carbonyl and 1 g. of hydroquinone, was added Swasol-310 (produced by Maruzen Sekiyu Co., B.P. 150-174.5° C., containing 52.7% of aromatics, 46.3% of naphthenes and paraffins and 1% of olefins), to make a 200 ml. solution, which was placed in a 500 ml.-volume autoclave. The content was subjected to the same reaction procedure as in Example 2. After the reaction was finished, the reaction mixture was cooled, and the two layers formed were separated from each other. Analyses showed 28.7 g. (69.2%) and 1.2 g. (2.9% of β-formylpropionitrile in the lower and upper layers, respectively.

Example 5

The same reaction procedure as in Example 3 was repeated, except that an ethyl acetate-cyclohexane mixed solvent in 1:7 volume ratio was employed instead of the tetrahydrofuran-cyclohexane mixed solvent. After the reaction was completed, the mixture was cooled to room temperature, and the two layers formed were separated from each other, which were then analyzed. Among 21.82 g. of β-formylpropionitrile formed, 99.3% was in the lower layer (39.9 g.) and only 0.4% by weight was in the upper layer (130 g.). As to cobalt carbonyl used in the reaction, 39.6% has been transferred to the lower layer.

Example 6

The same reaction procedure as in Example 3 was repeated, except that a benzene-cyclohexane mixed solvent in 1:2 volume was employed. After the reaction was finished, the reaction mixture was cooled to room temperature, and the two layers formed were separated from each other, which were then analyzed. β-formylpropionitrile formed was distributed in the ratio of 3.3% in the upper layer and 96.7% in the lower layer. The contents of β-formylpropionitrile in the upper and lower layers were 0.8% and 71.8% by weight, respectively. The total yield based upon acrylonitrile was 73.8%. The content of cobalt in the lower layer was 22.3% of the amount used, as cobalt carbonyl.

Employing the same procedure as above-described, but varying the mixing ratio of benzene and cyclohexane, the reactions were repeated, with the following results.

| Benzene/Cyclohexane (Volume ratio) | 1/3 | 1/5 | 1/30 |
| --- | --- | --- | --- |
| β-formylpropionitrile, yield (%): | | | |
| Upper layer | 1.54 | 1.03 | 0 |
| Lower layer | 67.28 | 64.26 | 59.23 |
| Total | 68.82 | 65.29 | 59.23 |

The upper layer of the reaction mixture (146 ml.) in the above procedure using the benzene-cyclohexane mixture of 1:2 volume ratio was added with 26.5 g. of fresh acrylonitrile and 0.30 g. of cobalt carbonyl and further mixed with 15 ml. of benzene and 5 ml. of cyclohexane to make the total volume 200 ml. The solution was subjected to the same reaction, followed by the same separation procedure as above, and 45.1 g. of the lower layer containing 29.8 g. of β-formylpropionitrile was separated, which corresponds to 71.7% of the theoretical yield. The cobalt content in the lower layer was 19.0% of the amount used, as carbonyl. Using the upper layer 7 times repeatedly, 40.7 g. of β-formylpropionitrile layer (63.4% purity by weight) was obtained, corresponding 70.8% yield. The cobalt carbonyl content in the layer was 0.21 g.

Example 7

A mixture of 24.6 g. of acrylonitrile, 1.2 g. of cobalt carbonyl and 1.0 g. of hydroquinone was dissolved in xylene to make a 200 ml. solution, which was subjected to the same reaction as in Examples 2. After the reaction was completed, the reaction mixture was cooled to room temperature, and the lower layer containing β-formylpropionitrile was separated similarly as in Example 1. The lower layer amounting 18.1 ml. contained 11.38 g. of β-formylpropionitrile and 0.20 g. of cobalt carbonyl, while, the upper layer contained 9.52 g. of β-formylpropionitrile. The total yield of β-formylpropionitrile was 54.2% of the theoretical amount.

Example 8

A mixture of 0.5 mole of acrylonitrile (containing 0.1% of hydroquinone) and 1 g. of cobalt carbonyl was dissolved in a methanol-cyclohexane mixed solvent in 1:2 volume ratio to make a 200 ml. solution, which was processed, cooled and separated as in Example 2. Analyses of the both layers showed that the lower amounting 92.0 ml. contained 0.36 mole (72.03% yield based upon acrylonitrile) of β-formylpropionitrile including its acetal, while, the upper layer amounting 102.0 ml. contained 0.0112 mole (2.24 mol percent based upon acrylonitrile) of β-formylpropionitrile including its acetal. The total yield of β-formylpropionitrile and its acetal was 74.27% based upon acrylonitrile.

Similar procedures, varying the mixing ratio of methanol and cyclohexane, yielded the following results.

| Methanol/Cyclohexane (Volume ratio) | 1/5 | 1/9 | 1/14 | 1/19 | 1/30 |
| --- | --- | --- | --- | --- | --- |
| Yield of β-formylpropionitrile plus its acetal: | | | | | |
| Upper layer | 2.79 | 2.77 | 2.19 | 1.59 | X |
| Lower layer | 65.97 | 60.84 | 60.12 | 55.69 | X |
| Total | 68.76 | 63.61 | 62.31 | 57.28 | X |

X means polymerization.

What we claim is:

1. In a method for producing beta-formylpropionitrile by reaction of acrylonitrile with a mixed gas consisting of carbon monoxide and hydrogen at elevated pressure, at a temperature of about 70°–120° C., and in the presence of a cobalt carbonyl catalyst, the improvement which comprises carrying out said reaction in a solvent which dissolves 0.09 to 20% by weight of beta-formylpropionitrile at 20° C., said solvent being selected from at least one member of the group consisting of cycloparaffinic hydrocarbon of 5 to 19 carbon atoms and having a boiling point of about 49° C. to 350° C. and aromatic hydrocarbon having a boiling point below 330° C., cooling the reaction mixture to a temperature below the reaction temperature to form a solvent layer containing said catalyst and a beta-formylpropionitrile layer, and separating said layers to obtain beta-formylpropionitrile.

2. A process as defined in claim 1 and after the separation of said layers, the further steps of reconstituting said solvent layer by adding acrylonitrile, said catalyst and said solvent, recycling the resulting solution into reaction with a mixed gas consisting of carbon monoxide and hydrogen at elevated pressure and at a temperature of about 70° to 120° C., and repeating the said procedures successively.

3. In a method for producing beta-formylpropionitrile by reaction of acrylonitrile with a mixed gas consisting of carbon monoxide and hydrogen at elevated pressure, at a temperature of about 70°–120° C., and in the presence of a cobalt carbonyl catalyst, the improvement which comprises carrying out said reaction in a solvent which dissolves 0.09 to 20% by weight of beta-formylpropionitrile at 20° C., said solvent consisting of a mixture of at least one paraffinic hydrocarbon of 5 to 19 carbon atoms and having a boiling point of about 28° C. to 330° C. and at least one hydrocarbon selected from the group consisting of cycloparaffinic hydrocarbon of 5 to 19 carbon atoms and having a boiling point of about 49° C. to 350° C. and aromatic hydrocarbon having a boiling point below 330° C., cooling the reaction mixture to a temperature below the reaction temperature to form a solvent layer containing said catalyst and a beta-formylpropionitrile layer, and separating said layers to obtain beta-formylpropionitrile.

4. A process as defined in claim 3 and after the separation of said layers, the further steps of reconstituting said solvent layer by adding acrylonitrile, said catalyst and said solvent, recycling the resulting solution into reaction with a mixed gas consisting of carbon monoxide and hydrogen at elevated pressure and at a temperature of about 70° C. to 120° C., and repeating the said procedure successively.

5. In a method for producing beta-formylpropionitrile by reaction of acrylonitrile with a mixed gas consisting of carbon monoxide and hydrogen at elevated pressure, at a temperature of about 70° C. to 120° C., and in the presence of a cobalt carbonyl catalyst, the improvement which comprises carrying out said reaction in a solvent which dissolves 0.09 to 20% by weight of beta-formylpropionitrile at 20° C., said solvent consisting of a mixture of at least one hydrocarbon selected from the group consisting of cycloparaffinic hydrocarbon of 5 to 19 carbon atoms and having a boiling point of about 49° C. to 350° C., aromatic hydrocarbon having a boiling point below 330° C. and paraffinic hydrocarbon of 5 to 19 carbon atoms and having a boiling point of about 28° C. to 330° C. and at least one oxygen-containing compound inert to said oxo-reaction and selected from the group consisting of alkanol having up to 8 carbon atoms, tetrahydrofurfuryl alcohol, cyclohexanol, ethylene glycol, propylene glycol, polyethylene glycol, alkanone of from 3 to 6 carbon atoms, cyclohexanone, alkyl acetate and alkyl propionate, said alkyl having up to 6 carbon atoms, cyclohexyl acetate, methyl and ethyl formate, ethylene glycol mono- and di-acetate, diethyl carbonate, diethyl oxalate, tetrahydrofuran, alkyl ether having up to 8 carbon atoms, methyl Cellosolve, Cellosolve, 1,2-propylene oxide and dioxane, cooling the reaction mixture to a temperature below the reaction temperature to form a said solvent layer by adding acrylontrile, said catalyst propionitrile layer, and separating said layers to obtain beta-formylpropionitrile.

6. A process as defined in claim 5 and after the separation of said layers, the further steps of reconstituting said solvent layer by adding acrylonitrile, said catalyst and said solvent, recycling the resulting solution into reaction with a mixed gas consisting of carbon monoxide and hydrogen at elevated pressure and at a temperature of about 70° C. to 120° C., and repeating the said procedures successively.

References Cited by the Examiner

UNITED STATES PATENTS 2,978,481   4/1961   Kato et al. _____ 260—465.1

FOREIGN PATENTS 838,737   6/1960   Great Britain.
910,767   11/1962   Great Britain.

CHARLES B. PARKER, *Primary Examiner.*

JOSEPH P. BRUST, *Assistant Examiner.*